US009927537B2

(12) United States Patent
Kim

(10) Patent No.: US 9,927,537 B2
(45) Date of Patent: Mar. 27, 2018

(54) SYSTEMS AND METHODS FOR POSITRON EMISSION TOMOGRAPHY SIGNAL ISOLATION

(71) Applicant: General Electric Company, Schenectady, NY (US)

(72) Inventor: Chang Lyong Kim, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 14/570,458

(22) Filed: Dec. 15, 2014

(65) Prior Publication Data

US 2016/0170045 A1    Jun. 16, 2016

(51) Int. Cl.
| | | |
|---|---|---|
| *G01T 1/29* | (2006.01) | |
| *G01J 1/44* | (2006.01) | |
| *G01T 1/208* | (2006.01) | |
| *G01T 1/20* | (2006.01) | |

(52) U.S. Cl.
CPC .............. *G01T 1/2985* (2013.01); *G01J 1/44* (2013.01); *G01T 1/208* (2013.01); *G01T 1/2018* (2013.01)

(58) Field of Classification Search
CPC ..... G01T 1/2985; G01T 1/2018; G01T 1/208; G01T 1/2914; G01T 1/20; G01T 1/24; G01T 1/247; G01T 1/29; G01T 1/248; G01T 1/00; G01J 1/44
USPC .............. 250/370.11, 370.08, 370.14, 208.1, 250/214 R, 363.09, 252.1
See application file for complete search history.

(56) References Cited

U.S. PATENT DOCUMENTS

| | | | |
|---|---|---|---|
| 5,519,437 A | 5/1996 | Nelvig | |
| 5,677,536 A | 10/1997 | Vickers | |
| 6,624,422 B2 | 9/2003 | Williams et al. | |
| 6,858,850 B2 | 2/2005 | Williams et al. | |
| 7,723,694 B2 | 5/2010 | Frach et al. | |
| 8,395,127 B1* | 3/2013 | Frach .................... | G01T 1/2018 250/370.08 |
| 8,476,594 B2 | 7/2013 | Frach et al. | |
| 2003/0105397 A1* | 6/2003 | Tumer .................. | G01T 1/2985 600/436 |
| 2005/0029453 A1 | 2/2005 | Allen et al. | |
| 2007/0029494 A1* | 2/2007 | Caruba ................ | G01T 1/2018 250/370.11 |

(Continued)

*Primary Examiner* — Que T Le
*Assistant Examiner* — Jennifer Bennett
(74) *Attorney, Agent, or Firm* — Dean D. Small; The Small Patent Law Group, LLC

(57) ABSTRACT

A positron emission tomography (PET) photosensor output circuit configured to be operably coupled to a PET photosensor system is provided that includes a plurality of regional circuit portions and a summing portion. Each regional circuit portion is configured to be operably coupled to a corresponding photosensor system region and includes an input portion, a first branch, and a second branch. The first branch includes a delay unit and a switch. The second branch includes a sensor unit configured to place the switch in a closed position when a signal received via the input portion satisfies a threshold and to place the switch in an open position when the signal received via the input portion does not satisfy the threshold. The summing portion is configured to receive corresponding regional circuit outputs from the regional circuit portions, and to combine the regional circuit outputs to provide a summed output.

22 Claims, 8 Drawing Sheets

(56) References Cited

U.S. PATENT DOCUMENTS

| | | | |
|---|---|---|---|
| 2008/0251709 A1 | 10/2008 | Cooke et al. | |
| 2011/0147567 A1* | 6/2011 | Grazioso | H01L 27/14609 250/208.1 |
| 2012/0001075 A1* | 1/2012 | Frach | G01T 1/2002 250/362 |
| 2012/0068050 A1* | 3/2012 | Mazzillo | G01J 1/46 250/208.1 |
| 2013/0009266 A1 | 1/2013 | Sato et al. | |
| 2013/0306876 A1* | 11/2013 | Uchida | G01T 1/1644 250/366 |
| 2013/0327932 A1 | 12/2013 | Kim et al. | |
| 2015/0285922 A1* | 10/2015 | Mintzer | G01T 1/208 600/411 |
| 2016/0084703 A1* | 3/2016 | Shaber | G01T 1/2018 250/336.1 |

* cited by examiner

SYSTEMS AND METHODS FOR POSITRON EMISSION TOMOGRAPHY SIGNAL ISOLATION

BACKGROUND OF THE INVENTION

The subject matter disclosed herein relates generally to imaging systems and techniques, and more particularly to reduction of the effect of dark current, for example.

In certain types of imaging devices, such as positron emission tomography (PET) scanners, arrays of detector elements are used to detect radiation emanating from the patient. In a PET scanner, for example, arrays of scintillator crystals may be used to detect annihilation photons which are generated inside the patient. The annihilation photons are produced when a positron emitted from a radiopharmaceutical injected into the patient collides with an electron causing an annihilation event. The scintillator crystals receive the annihilation photons and generate light photons in response to the annihilation photons, with the light photons emitted to a photosensor configured to convert the light energy from the light photons to electrical energy used to reconstruct an image.

Timing resolution of a time of flight (TOF) PET detector may depend on a number of components, including scintillation crystals and photosensors, and how the scintillation crystals and photosensors are combined into a detector along with readout electronics. Factors relating to the combination of the scintillation crystals and photosensors that may affect timing resolution include, for example, the light sharing scheme among the crystals and photosensors, the layout of photosensors, transit time spread between the photosensors, signal trace layout on amplifier board, and electronics noise, for example.

Because of the high speeds of photons (e.g., the speed of light) and relatively short distances traveled by the photons during imaging, the timing resolution of detectors is critical to imaging. This is even more so as demands for higher resolution increase. For example, in order to achieve sub-250 picosecond (ps) timing resolution with currently available lutetium based scintillators and silicon photomultipliers (SiPM's), direct coupling between a crystal array and a SiPM array may be achieved with a layer of optical glue or a relatively thin lightguide. In some instances a beveled lightguide may be employed; however, for example, timing for crystals located at a beveled edge may be degraded. Further, direct coupling may require optimization for various timing parameters, such as light collection, light spread, dark current, or fast rising edge of the signal, among others.

BRIEF DESCRIPTION OF THE INVENTION

In accordance with various embodiments, a positron emission tomography (PET) photosensor output circuit is provided. The PET photosensor output circuit is configured to be operably coupled to a PET photosensor system and includes a plurality of regional circuit portions and a summing portion. Each regional circuit portion is configured to be operably coupled to a corresponding photosensor system region and includes an input portion, a first branch, and a second branch. The input portion is configured to receive a signal from the corresponding photosensor system region. The first branch extends from the input portion, and includes a delay unit and a switch, with the delay unit interposed between the input portion and the switch. The second branch extends from the input portion. The second branch includes a sensor unit configured to place the switch in a closed position when a signal received via the input portion satisfies a threshold and to place the switch in an open position when the signal received via the input portion does not satisfy the threshold. The summing portion is operably coupled to the regional circuit portions. The summing portion is configured to receive corresponding regional circuit outputs from the regional circuit portions, and to combine the regional circuit outputs to provide a summed output.

In accordance with various embodiments, a positron emission tomography (PET) photosensor system is provided that includes plural photosensor regions and a photosensor output circuit. Each photosensor region includes at least one photosensor unit operably coupled to at least a portion of a crystal array, with each photosensor region configured to receive light from the at least a portion of the crystal array and to provide a regional photosensor output signal responsive to the received light. The photosensor output circuit is operably coupled to the plural photosensor regions, and includes a plurality of regional circuit portions and a summing portion. Each regional circuit portion is configured to be operably coupled to a corresponding photosensor system region and includes an input portion, a first branch, and a second branch. The input portion is configured to receive the regional photosensor output signal from the corresponding photosensor system region. The first branch extends from the input portion, and includes a delay unit and a switch, with the delay unit interposed between the input portion and the switch. The second branch extends from the input portion, and includes a sensor unit. The sensor unit is configured to place the switch in a closed position when a signal received via the input portion satisfies a threshold and to place the switch in an open position when the signal received via the input portion does not satisfy the threshold. The summing portion is operably coupled to the regional circuit portions. The summing portion is configured to receive corresponding regional circuit outputs from the regional circuit portions, and to combine the regional circuit outputs to provide a summed output.

In accordance with various embodiments, a method (e.g., a method for providing a PET detector system) is provided. The method includes operably coupling a positron emission tomography (PET) photosensor system including plural photosensor regions to a crystal array. Each photosensor region includes at least one photosensor unit operably coupled to at least a portion of the crystal array, with each photosensor region configured to receive light from the at least a portion of the crystal array and to provide a regional photosensor output signal responsive to the received light. The method also includes operably coupling the photosensor regions to a photosensor output circuit. The photosensor output circuit includes a plurality of regional circuit portions and a summing portion. Each regional circuit portion is configured to be operably coupled to a corresponding photosensor system region and includes an input portion, a first branch, and a second branch. The input portion is configured to receive the regional photosensor output signal from the corresponding photosensor system region. The first branch extends from the input portion, and includes a delay unit and a switch, with the delay unit interposed between the input portion and the switch. The second branch extends from the input portion and includes a sensor unit. The sensor unit is configured to place the switch in a closed position when a signal received via the input portion satisfies a threshold and to place the switch in an open position when the signal received via the input portion does not satisfy the threshold. The summing portion is operably coupled to the regional circuit portions, and is configured to receive corresponding regional circuit outputs from the regional circuit portions, and to combine the regional circuit outputs to provide a summed output.

DETAILED DESCRIPTION OF THE INVENTION

Figure 1:
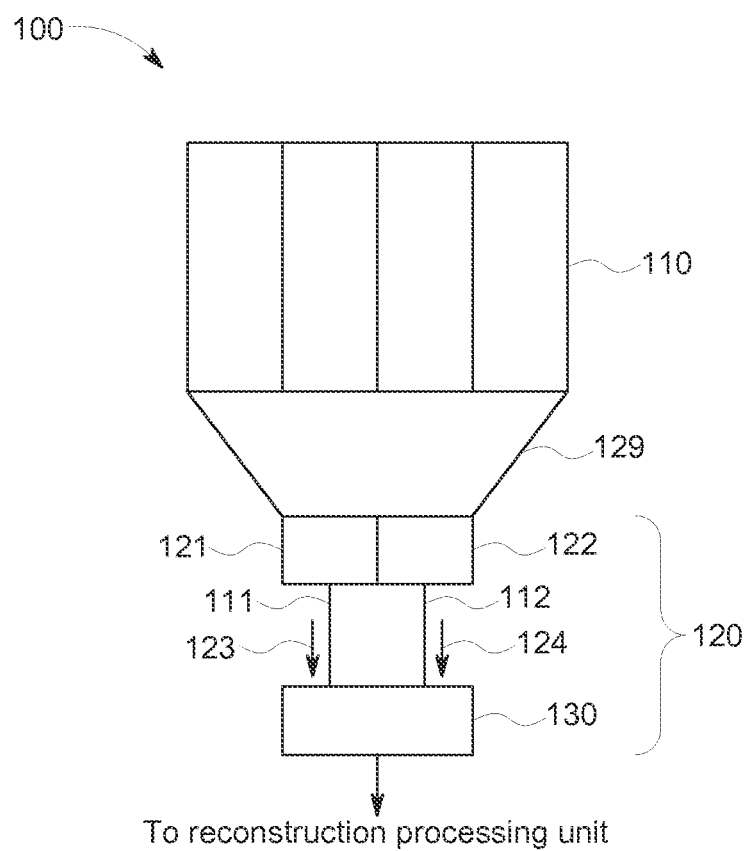
FIG. 1 is a schematic diagram of a PET detection system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof. "Systems," "units," or "modules" may include or represent hardware and associated instructions (e.g., software stored on a tangible and non-transitory computer readable storage medium, such as a computer hard drive, ROM, RAM, or the like) that perform one or more operations described herein.

The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems," "units," or "modules" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide PET photosensor and/or PET detector systems with improved timing resolution, for example due to the reduction of dark current effects. For example, a time-of-flight (TOF) detector may include distinct photosensor areas defined by and separated by light barriers. To reduce cost and/or heat generated by processing equipment, corresponding channels (e.g., timing channels, energy channels) from each area may be summed into one or more combined outputs. However, during such summing, signals caused by dark current are also summed, which may be result in reduced signal quality, timing resolution, or the like. As used herein, dark current may be understood as signals generated by a photosensor due to sources other than light (e.g., light from a scintillation crystal corresponding to the impingement and absorption of gamma rays or photons). For example, increasing temperature may increase the probability of electrons moving from a valance band to a conduction band of a semiconductor, resulting in increased thermal electrons that are a source of dark current. Signals from dark current may, for example, obscure onset and/or other portions of a signal caused by impingement of a gamma ray and resulting light emitted by crystal array. As the onset of the signal may be used in determining timing, dark current may reduce timing resolution, for example.

Various embodiments provide for regional circuits that include delay lines and associated switches for controlling the output from each photosensor region. In some embodiments, a sensor (e.g., comparator) of a given regional circuit may receive generated signals from a corresponding photosensor region dedicated to that particular regional circuit, check to insure that the signal is large enough to correspond to a light signal and not merely dark current, and then operate the switch to allow transmission of signals generated responsive to received light (e.g., signals corresponding to gamma ray impingement), while opening the switch to prevent transmission of signals not corresponding to received light. Each particular photosensor circuit may thus only contribute to a summed signal of all photosensor circuits when the signal satisfies a threshold corresponding to gamma ray impingement, thereby preserving useful information and maintaining photon detection efficiency, while discarding or excluding at least a portion of dark current signals.

A technical effect of at least some embodiments provides improved detector performance. For example, a technical effect of at least some embodiments includes improvement of timing resolution. As another example, a technical effect of at least some embodiments provides reduction of the effect of dark current on photosensor performance. A technical effect of at least some embodiments provides for reduced cost of photosensor systems (e.g., by providing improved performance for arrangements utilizing summing circuits and reduced timing related electronic componentry). Also, timing pick-up related circuits are costly and may require relatively high power consumption. A technical effect of at least some embodiments provides for reduction of dark current effects while preserving photon detection efficiency.

FIG. 1 provides a schematic diagram of a PET detection system 100 formed in accordance with various embodiments. The depicted PET detection system 100 includes a crystal array 110, a light guide 129, and a photosensor system 120. Generally, the PET detection system 100 is configured to receive a photon or gamma ray, and provide an output indicative of the energy of the gamma ray, the location of impact of the gamma ray, and the timing of the impact of the gamma ray to a reconstruction processing unit. The reconstruction processing unit may then the use the information from the PET detection system 100 and other generally similar PET detection systems disposed about an object to be imaged to reconstruct an image of at least a portion of the object to be imaged.

The depicted crystal array 110 is configured to be impacted by gamma rays or photons during a PET scan and to produce light in response to being impacted by gamma rays or photons. The crystal array 110 is an example of a scintillator block that produces light in response to the impact of gamma rays or photons. The light may be detected by an associated photosensor (e.g. Silicon photomultiplier (SiPM)) and used to reconstruct an image. The crystal array 110 may be formed, for example from a group of crystals, with one or more internal light barriers between groups of crystals. For ease of illustration and clarity of description, it may be noted that only one crystal array 110 and only one PET detection system 100 are shown in FIG. 1. It may be noted that, in practice, multiple generally similar PET detection systems 100 may be disposed about an object being imaged (e.g., in a ring), with photons from a given annihilation event striking opposite crystal arrays or detection systems 100. The particular numbers and/or arrangement of detections systems, crystals, and photosensors (and/or photosensor regions) for the various embodiments depicted and/or discussed herein are provided by way of example. Other numbers and/or arrangements may be employed in various embodiments.

The light guide 129 is disposed between the crystal array 110 and the photosensor system 120. The light guide 129 is configured to direct light from the crystal array 110 (e.g., light generated in response to the impact of annihilation photons on the crystal array 110) to the photosensor system 120. The light guide 129, for example, may be made of plastic or glass. Generally, the light guide 129 may be configured to have a refractive index that is close to the refractive index of the crystal array 110 or close to the refractive index of photosensor 122 to help in the transfer of light from the crystal array 110 to the photosensor system 120. In case of direct coupling, optical epoxy may be utilized without a lightguide. In the illustrated embodiment, the light guide 129 is beveled (e.g., has a larger cross-section proximate to the crystal array 110 than proximate to the photosensor system 120). Thus, the area and/or number of photosensors may be reduced, thereby reducing the cost.

The depicted photosensor system 120 is configured to receive, via the light guide 129, light generated by the crystal array 110, and to provide an electrical charge or output (e.g., one or more signals to a reconstruction processing unit) responsive to the received light. The photosensor system 120 of the illustrated embodiment includes a first photosensor region 121, a second photosensor region 122, and a photosensor output circuit 130. The photosensor output circuit 130 is operably coupled to the first photosensor region 121 via path 111 and to the second photosensor region 122 via path 112. The first photosensor region 121 provide first photosensor region output signal 123, and the second photosensor region 122 provides second photosensor region output signal 124. The photosensor output circuit 130 is configured to sum signals from the photosensor regions (e.g., 121, 122 in the illustrated embodiment), thereby reducing the number of components for processing signals from the photosensor regions, and thus reducing both the cost of associated components as well as the heat generated by the associated components. However, as noted above, such just summing all inputs may also act to sum dark current. Generally, various embodiments reduce the effects of dark current by using regional circuit portions to evaluate the outputs of corresponding photosensors, to selectively provide output signals corresponding to the impact of gamma rays from the regional circuit portions to a summing portion, and to prevent the passage of signals not corresponding to the impact of gamma rays to the summing portion.

For example, the depicted photosensor output circuit 130 may include a plurality of regional circuit portions, with each regional circuit portion configured to be operably coupled to a corresponding photosensor region (e.g., a first regional circuit portion operably connected to the first photosensor region 121 and configured to receive first photosensor region output signal 123 via path 111, and a second regional circuit portion operably coupled to the second photosensor region 122 and configured to receive second photosensor region output signal 124 via path 112). Each regional circuit portion may include a delay unit and an associated switch (see, e.g., FIGS. 2 and 3), and be configured to provide a regional circuit portion output to a summing portion of the photosensor output circuit 130. Those regional circuit portions that receive signals corresponding to the impact of a gamma ray may pass those signals on to the summing portion, while those regional circuit portions that receive signals that do not correspond to the impact of a gamma ray may prevent passage of those signals to the summing portion. The summing portion is operably coupled to the regional circuit portions, receives corresponding regional circuit outputs from the regional circuit portions, and combines the regional circuit outputs to provide a summed output. The regional circuit portions may be understood as gatekeepers configured to allow passage of signals corresponding to gamma rays to the summing portion while preventing, inhibiting, or reducing the passage of signals corresponding to dark current or otherwise not corresponding to gamma rays. The output provided from the photosensor output circuit 130 to the reconstruction processing unit may include timing information, energy information, and positional information (e.g., x and z locations corresponding to which portion of which crystal array was impacted by a gamma ray).

Generally, each photosensor region provides an independent output (e.g., independent of other photosensor regions) signal unique to that region and corresponding to the impact of gamma rays or photons on a portion of the crystal array associated with the particular region. It may be noted that a given gamma ray may result in an output from more than one photosensor region, for example due to Compton scattering. In various embodiments, photosensor regions may be formed from one or more vacuum photomultipliers, avalanche photodiodes, or silicon photomultipliers. Each photosensor region, for example, may be configured as a separate semiconductor in some embodiments, while, in other embodiments, multiple photosensor regions may be present on a single semiconductor. In various embodiments, the photosensor output circuit 130 may be disposed on one or more unit that is separate from the photosensor regions (e.g., integrated chip (IC) such as application specific integrated chip (ASIC)). In other embodiments, at least a portion of the photosensor output circuit 130 may be disposed on a semiconductor such as a complementary metal oxide semiconductor (CMOS) on which one or more photosensor regions are disposed. In some embodiments, a portion of the photosensor output circuit 130 may be disposed on a CMOS and another portion on an ASIC (e.g., regional circuits disposed on CMOS and summing circuit disposed on ASIC). Additional discussion regarding one embodiment of a photosensor output circuit 130 is shown in FIGS. 2 and 3.

Figure 2:
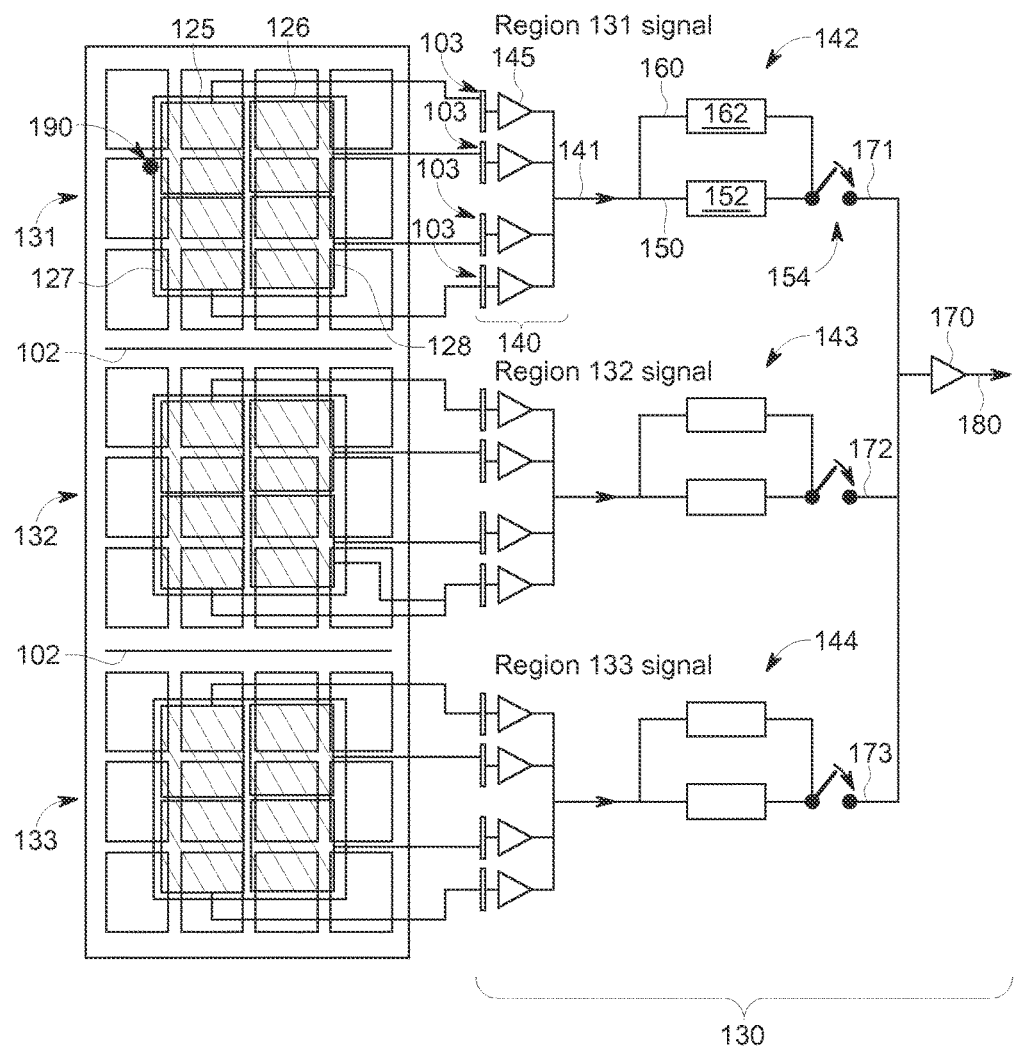
FIG. 2 is a schematic diagram of a PET photosensor system in accordance with various embodiments.
Figure 3:
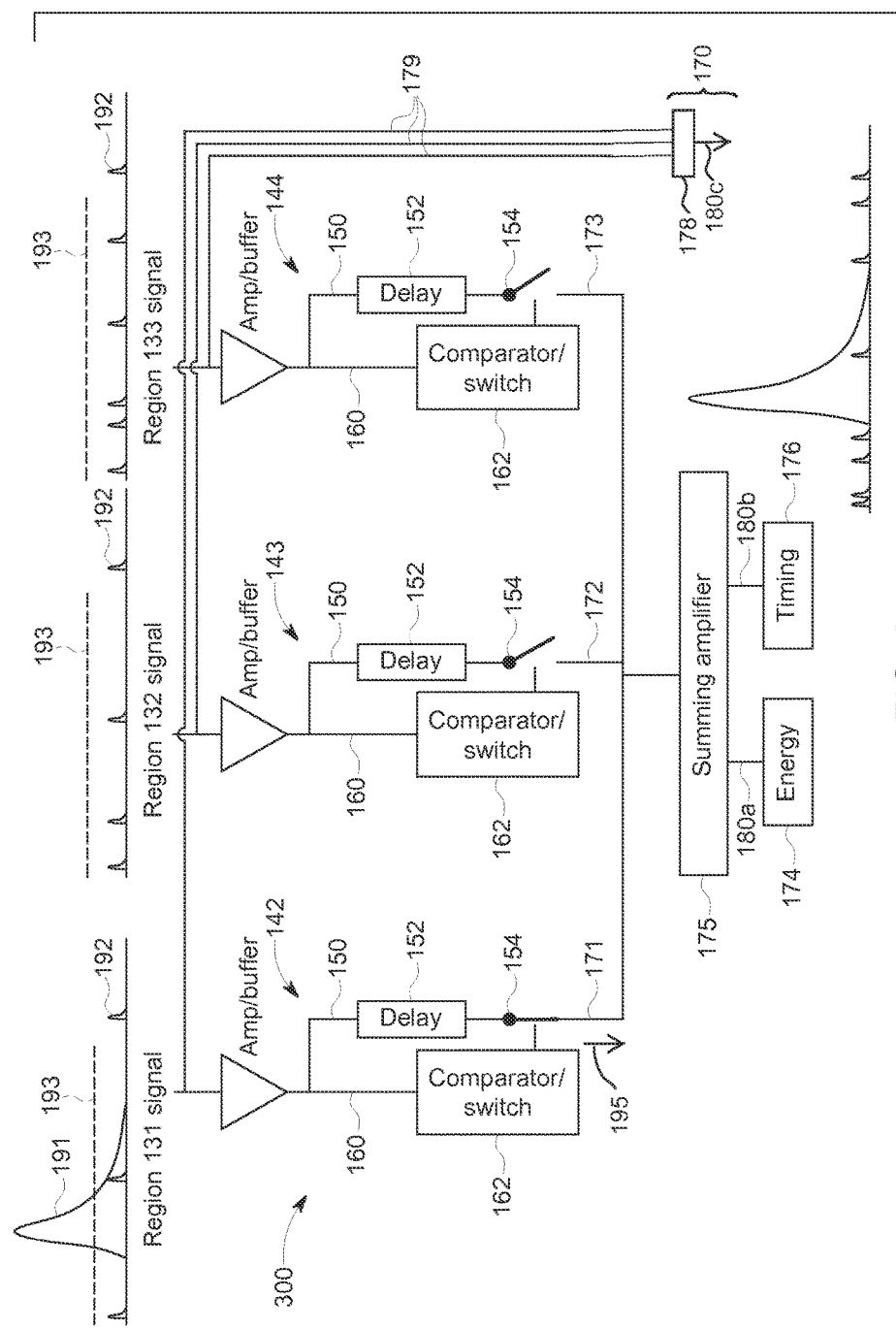
FIG. 3 is a schematic diagram of a PET photosensor system in accordance with various embodiments.

FIG. 2 illustrates an example of the photosensor output circuit 130 in accordance with various embodiments. The photosensor output circuit 130 includes regional circuit portions 142, 143, 144, and a summing portion 170. The regional circuit portions 142, 143, 144 receive photosensor outputs from corresponding photosensor regions, and provide regional circuit outputs to the summing portion 170. The summing portion 170 receives the regional circuit outputs and provides a summed output 180. The summed output may include only timing information or both timing and energy information. Positional information corresponding to the impact of gamma rays on a scintillator associated with the various photosensor regions is not shown in FIG. 2.

As seen in FIG. 2, each photosensor region is separated from the other photosensor regions by light barriers 102. Each photosensor region is operably coupled to a corresponding regional circuit portion and provides an output to the corresponding regional circuit portion. For the depicted embodiment, a first photosensor region 131 provides outputs from each photosensor unit of the first photosensor region 131 to the first regional circuit portion 142. Similarly, a second photosensor region 132 provides outputs from each photosensor unit of the second photosensor region 132 to the second regional circuit portion 143. Also, a third photosensor region 133 provides outputs from each photosensor unit of the third photosensor region 133 to the third regional circuit portion 144. The depicted photosensor regions include photosensor units. For example, the depicted first photosensor region 131 includes photosensor unit 125, photosensor unit 126, photosensor unit 127, and photosensor unit 128. Each photosensor unit may provide an output that is independent or distinct from the output of other photosensor units. In the illustrated embodiment, each photosensor region includes 4 photosensors that correspond to 12 portions of a crystal array (in FIG. 2, the crystal array portions are shown without shading and the photosensor portions with shading). In the depicted embodiment, the photosensor regions have a smaller combined area than the crystal portions. It may be noted that other numbers and/or arrangements of photosensor regions and/or crystal portions may be used in various embodiments. In some embodiment, each photosensor region may have only a single photosensor unit associated therewith.

In the depicted embodiment, each regional circuit portion receives signals from the photosensor units of the corresponding photosensor region, and provides a regional circuit output. As seen in FIG. 2, the first regional circuit portion 142 receives signals from the first photosensor region 131, and provides a first regional circuit output 171 to the summing portion 170. Also, the second regional circuit portion 143 receives signals from the second photosensor region 132, and provides a second regional circuit output 172 to the summing portion 170. Similarly, the third regional circuit portion 144 receives signals from the third photosensor region 133, and provides a third regional circuit output 173 to the summing portion 170.

As discussed herein, the regional circuit portions are configured to pass on signals corresponding to an impact of light on the corresponding photosensor region due to gamma ray impact on an associated crystal portion, and to inhibit passage of signals only corresponding to dark current or otherwise not resulting from gamma ray impact. For clarity and ease of illustration, only the first regional circuit portion 142 will be discussed in detail; however, the same principles discussed in connection with the first regional circuit portion 142 apply to the other regional circuit portions.

As seen in FIG. 2, the first regional circuit portion 142 includes an input portion 140, a first branch 150, and a second branch 160. Generally, the input portion 140 receives one or more signals from one or more photosensors of an associated photosensor region (e.g., in the illustrated embodiment, the first photosensor region 131 is associated with the first regional circuit portion 142). The received signal is then passed through a delay unit of the first branch 150 while a sensor unit (e.g., comparator) of the second branch 160 evaluates the signal based on one or more criteria. For example, the sensor unit may determine whether the signal has a strength satisfying a threshold above a dark current signal strength. Based on the evaluation of the signal, the sensor unit controls a switch of the first branch 150 to transmit the signal (e.g., the signal being delayed by the delay unit during evaluation) to the summing portion 170 if the signal is evaluated to correspond to a gamma ray impact, and to not transmit the signal to the summing portion 170 if the signal is evaluated to not correspond to a gamma ray impact.

The depicted input portion 140 is configured to receive the regional photosensor output signal(s) from a corresponding photosensor region. For example, the depicted input portion 140 of the first regional circuit portion 142 includes buffer amplifiers 145 that each receive inputs from individual photosensor units of the first photosensor region 131 (which together form a regional photosensor output or signal) via connections 103. The signals after passage through the buffer amplifiers 145 are summed to provide a signal 141 that is transmitted to the first branch 150 and the second branch 160. The signal 141 corresponds to the output signals of the photosensor units of the first photosensor region 131. For example, as seen in FIG. 2, a gamma ray 190 is shown as impacting the crystal associated with the first photosensor region 131. Thus, the signal 141 has a strength corresponding to an impact of a gamma ray. The signal 141 may also include signals resulting from dark current from one or more of the photosensor units 125, 126, 127, 128 of the first photosensor region 131.

The depicted first branch 150 extends in a first direction from the input portion 140, and includes a delay unit 152 and a switch 154. The delay unit 152 is interposed between the input portion 140 and the switch 154, so that a signal passes through the delay unit 152 before arriving at the switch 154. Generally, the delay unit 152 is configured to delay passage of a signal to the switch while the signal (e.g., a signal strength) is evaluated to determine if the switch 154 should be opened to prevent transmission of the signal to the summing portion 170 or closed to permit transmission of the signal to the summing portion 170. The delay unit 152, for example, may include a substantially lengthened conductive path (e.g., relative to a straight path) for the signal to travel through. In various embodiments, the delay unit 152 may be a passive circuit, and in other embodiments the delay unit 152 may be an active circuit. In various embodiments, the length of delay provided by the delay unit 152 is selected or configured to correspond to the processing or evaluation time required to evaluate the signal (e.g., to determine if the signal exceeds a threshold value corresponding to reception of a gamma ray by a scintillator). Further, the delay unit 152 may be configured to provide a sufficiently long delay to account for, reduce, or minimize switch noise effect.

The depicted second branch 160 extends from the input portion 140 in a second direction (e.g., a different direction from the first branch 150) and includes a sensor unit 162. The sensor unit 162 is operably connected to the switch 154 and is configured to control the switch 154. For example, in the illustrated embodiment, if the signal received by the regional circuit portion 142 satisfies (e.g., meets or exceeds) a threshold, the sensor unit 162 is configured to place the switch 154 in a closed position to allow transmission of the signal from the delay unit 152 to the summing portion 170. However, if the signal received by the regional circuit portion 142 does not satisfy the threshold, the sensor unit 162 is configured to place the switch 154 in an open position to prevent transmission of the signal from the delay unit 152 to the summing portion 170. The sensor unit 162 may include, for example, a comparator. The threshold may be set at a value to prevent passage of dark current signals, while still allowing passage of signals due to light received by a photosensor due to impingment of a gamma ray or photon on a corresponding scintillator. It may be noted that, due to Compton scattering or charge sharing, light from a given gamma ray impingement may result in a signal from two or more photosensor regions. A signal that corresponds to charge sharing or Compton scattering may have a reduced strength relative to a signal corresponding to a non-shared gamma ray impingement. Thus, the threshold may be set substantially lower than a signal strength of a non-shared gamma ray impingement (e.g., at a fraction such as ½, ⅓, ¼, or ¹⁄₁₀ of a signal strength corresponding to a non-shared impingement) while still set high enough to eliminate, minimize, or reduce the identification of a dark current signal as satisfying the threshold. The particular values selected, for example, may be based on an anticipated amount and/or level of Compton scattering and/or an expected dark current signal strength for a particular detection system configuration.

FIG. 3 illustrates a schematic view of a photosensor output circuit 300 in accordance with various embodiments. The photosensor output circuit 300 may include various aspects generally similar to the photosensor output circuit 130 discussed in connection with FIG. 2. For example, as seen in FIG. 3, with the gamma ray 190 impinging the portion of the scintillator corresponding to the first photosensor region 131, the signal 195 for the first photosensor region 131 includes a positive signal 191 (or a signal corresponding to impingement of the gamma ray 190) as well as dark current signals 192. The depicted positive signal 191 corresponds to a full strength signal (e.g., all of the light received by a single photosensor region); however, signals corresponding to lower energies (e.g., signals from plural photosensor regions due to Compton scattering) may provide positive signals as well. The threshold 193 is above the peak of the dark current signals 192 but below the peak of the positive signal 191. Accordingly, the sensor unit 162 of the first regional circuit 142 puts the switch 154 of the first regional circuit 142 in the closed state, allowing passage of the signal 195 to the summing circuit as the first regional circuit output 171. It may be noted that the threshold 193 of the depicted embodiment is set relatively close to the dark current signal strength (e.g., may be offset above a dark current signal strength by a predetermined safety factor), to minimize or reduce the loss of any signals resulting from shared charge events. Use of a lower threshold allows more complete identification of signals corresponding to Compton scattering or shared charge events, for example.

In contrast to the first photosensor region 131 which includes a positive signal 191, for both the second photosensor region 132 and the third photosensor region 133, there is no corresponding gamma ray impingement, and the corresponding signals received by the second photosensor region 132 and the third photosensor region 133 only include dark current signals 192 which are below the threshold 193. Accordingly, the sensor units 162 of the second photosensor region 132 and the third photosensor region 133 place the switches 154 of the second photosensor region 132 and the third photosensor region 133 in the open position, so that no dark currents are transmitted to the summing portion 170 via the second photosensor region 132 and the third photosensor region 133. Put another way, the second regional circuit output 172 and the third regional circuit output 173 include no signals or have a signal strength of zero. Thus, the dark current signals from the second and third photosensor regions are prevented from being transmitted to the summing portion 170, and only the dark current signals from the first photosensor region 131 are transmitted, thereby reducing or eliminating the summing of dark current from plural photosensor regions. Generally, only dark current signals that are from a photosensor region that also has a positive signal may be transmitted to the summing portion 170, and dark current signals from regions that do not have a positive signal are excluded. For instance, in the illustrated embodiment, assuming that each photosensor region has an amount of dark current signals about equal to the other regions, the dark current signal transmitted to the summing portion 170 and thereby having an effect on a signal or signals used for image reconstruction is about ⅓ of the total dark current signal generated by all of the photosensor regions.

For the embodiment illustrated in FIG. 3, the summing portion 170 includes a summing amplifier 175 which receives the regional circuit outputs, sums the regional circuit outputs, and provides an output signal. In the illustrated embodiment, the summing amplifier 175 provides an energy output 180a to an energy output module 174 (e.g., an analog to digital converter (ADC)) that provides an energy output (e.g., for an energy channel) that may be used in image reconstruction. The summing amplifier 175 also provides a timing output 180b to a timing output module 176 (e.g., timing to digital converter (TDC)) that provides a timing output (e.g., for a timing channel) that may be used in image reconstruction. Output from the timing output module 176 may be utilized in connection with timing resolution, for example. It may be noted that the reduction in dark current reduces the noise and/or improves signal quality for both the timing output and the energy output in the illustrated embodiment.

Additionally, the summing portion 170 of the photosensor output circuit 130 depicted in FIG. 3 also includes a positional summing amplifier 178. The positional summing amplifier 178 receives positional signals or positional information from the regional circuit portions. As the positional information of signals from the photosensor regions (e.g., information describing an x and z position corresponding to reception of light generated by a scintillator) is not as sensitive to dark current as, for example, timing information, the positional information may be provided to the positional summing amplifier 178 via bypass paths 179 that bypass the switches of the regional circuit portions. The positional summing amplifier 178 provides a position output 180c that may be used in image reconstruction in conjunction with information from the energy output and timing output of the summing portion 170. It may further be noted that one or more aspects of the positional summing amplifier 178 may be combined or in communication with the summing amplifier 175. The positional summing amplifier 178 may be a slower or lower-powered amplifier than the summing amplifier 175 in various embodiments, as the positional summing amplifier 178 may have lower bandwidth requirements than the summing amplifier 175.

As discussed herein, the regional circuit portions may generally act as gatekeepers, with only dark current for those photosensor units of a photosensor region that also has a positive signal being transmitted to a summing portion for further processing or use. For example, with 3 photosensor regions having 4 photosensor units per region (or a total of 12 photosensor units), dark current from 4 photosensor units instead of from 12 photosensor units is passed on in the illustrated embodiment, for which only one photosensor region has an associated gamma ray impingement. If each photosensor region only had 1 photosensor unit, than dark current from only one photosensor unit would be transmitted per photosensor region having a corresponding gamma ray impingement event (e.g., reception of light sufficient to satisfy the threshold of the sensor unit 162).

Figure 4:
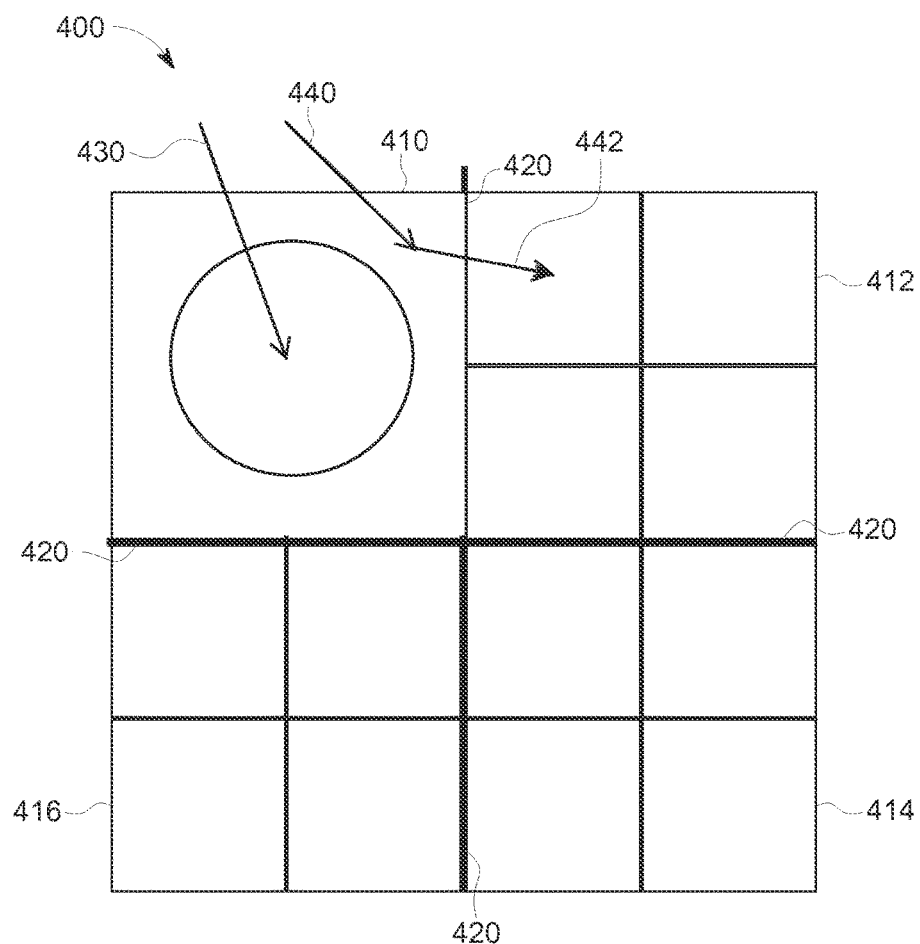
FIG. 4 illustrates examples of gamma ray impingement on a detection system formed in accordance with various embodiments.

FIG. 4 illustrates examples of gamma ray impingement on a detection system 400 formed in accordance with various embodiments. The depicted detection system has a first photosensor region 410, a second photosensor region 412, a third photosensor region 414, and a fourth photosensor region 416. The photosensor regions are separated and defined by light barrier 420. In an example scenario, a first gamma ray 430 impinges a scintillator disposed above and corresponding to the first photosensor region 410, and a regional circuit associated with the first photosensor region 410 thus provides a signal output to a summing portion, while regional circuits associated with the remaining photosensor regions do not. Accordingly, the dark current signal effect is reduced by one fourth, assuming all photosensor regions produce dark current signals equally.

In a second example scenario, a second gamma ray 440 impinges the scintillator associated with the first photosensor region 410, but also results in Compton sharing with a portion 442 providing light from the scintillator to the second photosensor region 412. Thus, regional circuit portions from both the first photosensor region 410 and the second photosensor region 412 will identify positive signals (assuming the portion 442 provides a signal above a switching threshold of the regional circuit portions), and signals from both the first photosensor region 410 and the second photosensor region 412 will be transmitted to the summing portion. Here, dark current signals from both the first photosensor region 410 and the second photosensor region 412 will be passed to the summing portion, but the total effect of dark current will still be reduced by ½ (as the dark current signals from the third photosensor region 414 and the fourth photosensor region 416) are prevented from transmission to the summing portion). It may be noted that the depicted embodiment is provided by way of example for illustrative purposes, and that large block sizes (e.g., larger numbers of photosensor regions) may be utilized, for example thereby reducing relatively high power TDC and/or ADC electronics. Generally, the more photosensor regions are employed, the more dark current effects may be limited.

It may be noted that, in various embodiments, the photosensor output circuit (or circuits) for a given detection system may be disposed on one or more ASICs. Alternatively, one or more aspects (e.g., the regional circuit portions) of a photosensor output circuit may be disposed on a semiconductor for CMOS based SiPM applications. For example, each pixel of a CMOS based SiPM may have a regional circuit portion associated therewith, so that for each pixel only signals exceeding a predetermined dark current threshold may be transmitted for future processing and/or use with image reconstruction. Such CMOS based SiPM embodiments may be configured for use with a variety of block arrangements.

Figure 5:
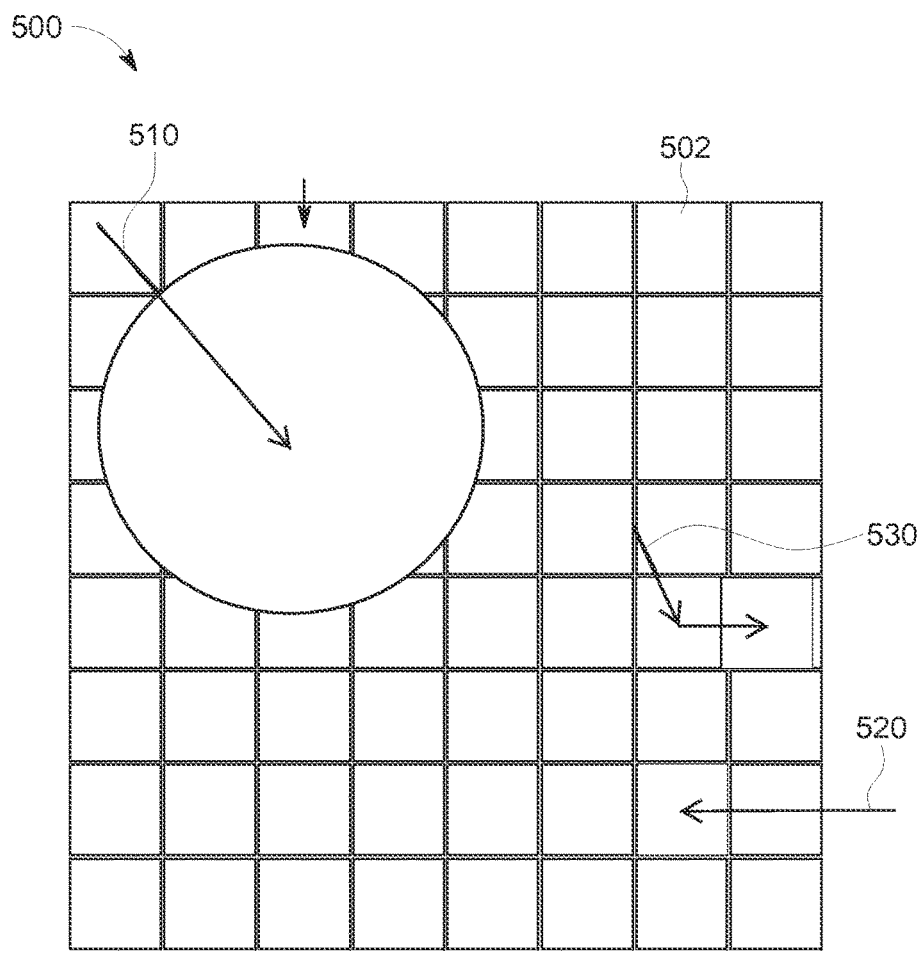
FIG. 5 illustrates examples of gamma ray impingement on a detection system formed in accordance with various embodiments.

FIG. 5 illustrates examples of gamma ray impingement on a detection system 500 formed in accordance with various embodiments. The detection system 500 includes crystals 502. Examples of both isolated crystals and isolated crystals are discussed in connection with FIG. 5. When a gamma ray interacts with a crystal and deposits its energy in the crystal, the crystal emits scintillation light. Depending on the block design, the light may be shared among plural SiPMs in a light sharing block design, or one or a few in an optically limited crystal array. In a first example scenario with non-isolated crystals, gamma ray 510 impinges the detection system 500 and results in the spread of light via non-isolated crystals. In a second example scenario with isolated crystals, a gamma ray 520 impinges the detection system 500 and results in light transmitted from only a single crystal. In a third example scenario with isolated crystals, a gamma ray 530 impinges the detection system 500 and results in light emitted from two crystals due to Compton scattering (it may be noted that gamma ray portions resulting from Compton scattering may have sufficient energy to cross a light barrier. It may be noted that, for large block sizes, the number of SiPMs (e.g., with each SiPM defining a photosensor region) having sufficiently strong signals to satisfy a switching threshold may be substantially less than the total number of SiPMs. Accordingly, only those SiPMs corresponding to gamma ray impingement may contribute information to a timing channel. It may be additionally noted that the benefits of dark current effect is not limited to timing resolution improvement. As one example, for low light output crystals (e.g. Bismuth Germanium Oxide (BGO; $Bi_4Ge_3O_{12}$) crystals), energy resolution may be substantially degraded by dark current. By reducing the total dark current contribution to an energy channel or signal, the energy resolution may be improved.

Again it may be noted that all or a portion of a photosensor output circuit may be disposed on a CMOS. For example, for a CMOS based SiPM, a control circuit within the SiPM may be configured as or include a regional circuit portion as discussed herein, with the output from the individual SiPM being enabled when a signal from the SiPM satisfies a switching or dark current threshold (e.g., the signal is identified as corresponding to a gamma ray impingement, or has a strength above a predetermined expected dark current signal strength). For example, electronics including or corresponding to a regional circuit portion may be located in a corner of a SiPM, or, as another example, in the middle of a SiPM. In some embodiments, the summing portion of the photosensor circuit may be disposed on an ASIC operably coupled to multiple SiPMs. Further still, in some embodiments, a monolithic SiPM arrangement may be employed. In such an arrangement, several SiPM channels may be disposed on a single die. The SiPM channels from a given die or region may be summed and sent to a single delay line (e.g., a path having a delay unit and switch, with the switch controlled by a sensor unit that evaluates whether a signal satisfies a dark current threshold or threshold configured above a dark current signal level), thereby reducing the number of delay lines.

Figure 6:
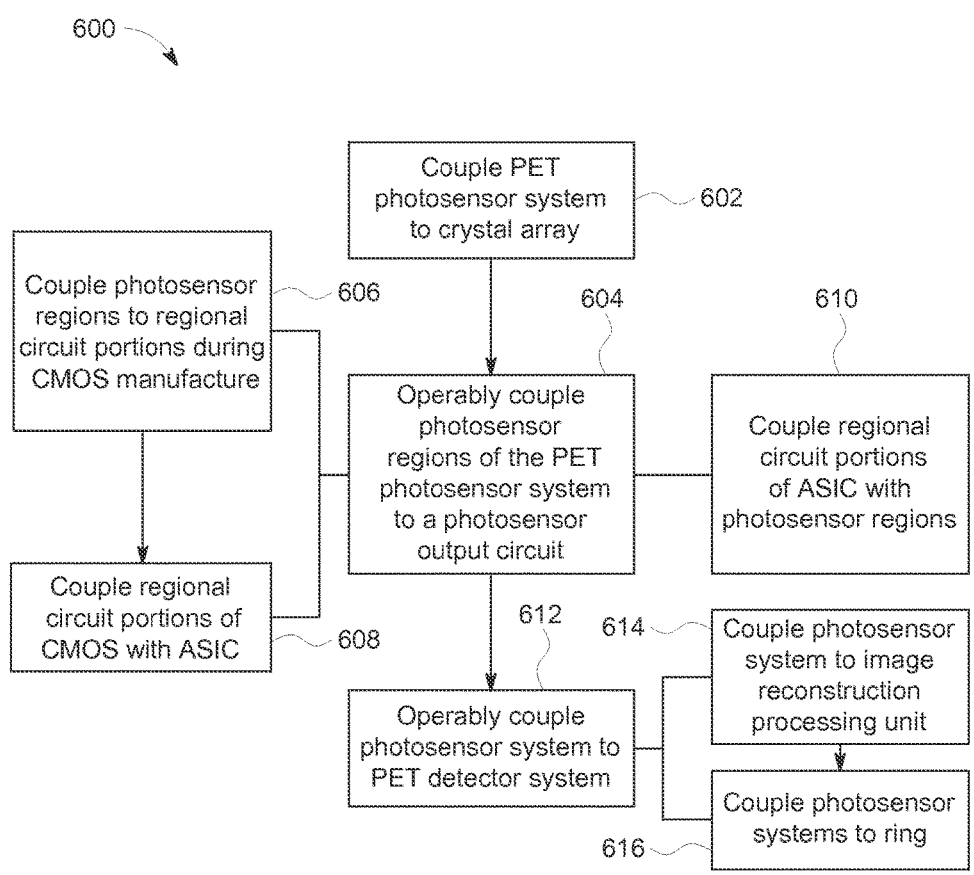
FIG. 6 is a flowchart of a method in accordance with various embodiments.

FIG. 6 provides a flowchart of a method 600 for forming a detection system in accordance with various embodiments. The detection system, for example, may be configured for use with a PET imaging system. The method 600, for example, may employ, include, or relate to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 602, a positron emission tomography (PET) photosensor system is operably coupled to a crystal array. The PET photosensor system includes plural photosensor regions. Each photosensor region includes at least one photosensor unit (e.g., SiPM) operably coupled to at least a portion of the crystal array. Each photosensor region is configured to receive light from the at least a portion of the crystal array to which it is coupled and to provide a regional photosensor output signal responsive to the received light. The crystal array, or scintillator block, and photosensor system may be aligned so that an emission surface of the scintillator is oriented toward a surface of the photosensor system configured to receive light energy. In various embodiments, the scintillator and the photosensor system may define the same area, while in other embodiments the scintillator and the photosensor system may define different areas (e.g., the scintillator may define a greater area). Further, photosensor units of the photosensor system and crystal portions of the crystal array, and/or the pixels of the photosensor system and crystals of the scintillator may or may not align or match. In some embodiments, a light guide may be interposed between the scintillator and photosensor system.

At 604, the photosensor regions are operably coupled to a photosensor output circuit (e.g., a photosensor output circuit as discussed herein such as photosensor output circuit 130). For example, each photosensor region may be electrically coupled or placed in electrical communication with a corresponding regional circuit portion of the photosensor output circuit. Thus, each regional circuit portion may receive a signal (or signals) independently generated by a dedicated or corresponding photosensor regions for evaluation, and transmit the signal to a summing portion of the photosensor output circuit if the signal is determined to correspond to a gamma ray impingement. In some embodiments, the regional circuit portions may be part of a CMOS based SiPM and the summing portion may be disposed on an ASIC. Thus, the photosensor regions may be operably coupled to the regional circuit portions during CMOS manufacture at 606, with the regional circuit portions subsequently placed in electrical communication with the ASIC on which the summing portion is disposed at 608. As another example, in some embodiments, the regional circuit portions and summing portion may be disposed on a common ASIC, with the regional circuit portions placed in electrical communication with the photosensor regions during assembly at 610.

At 612, the photosensor system is operably coupled to a PET detector system. For example, the photosensor system may be coupled to an image reconstruction processing unit at 614, and provide an output (e.g., energy information, timing information, positional information) to the processing unit for use in image reconstruction. It may be noted that plural photosensor systems may be disposed about a ring configured to surround an object to be imaged at 616, with each of the photosensor systems operably coupled to the reconstruction processing unit.

Figure 7:
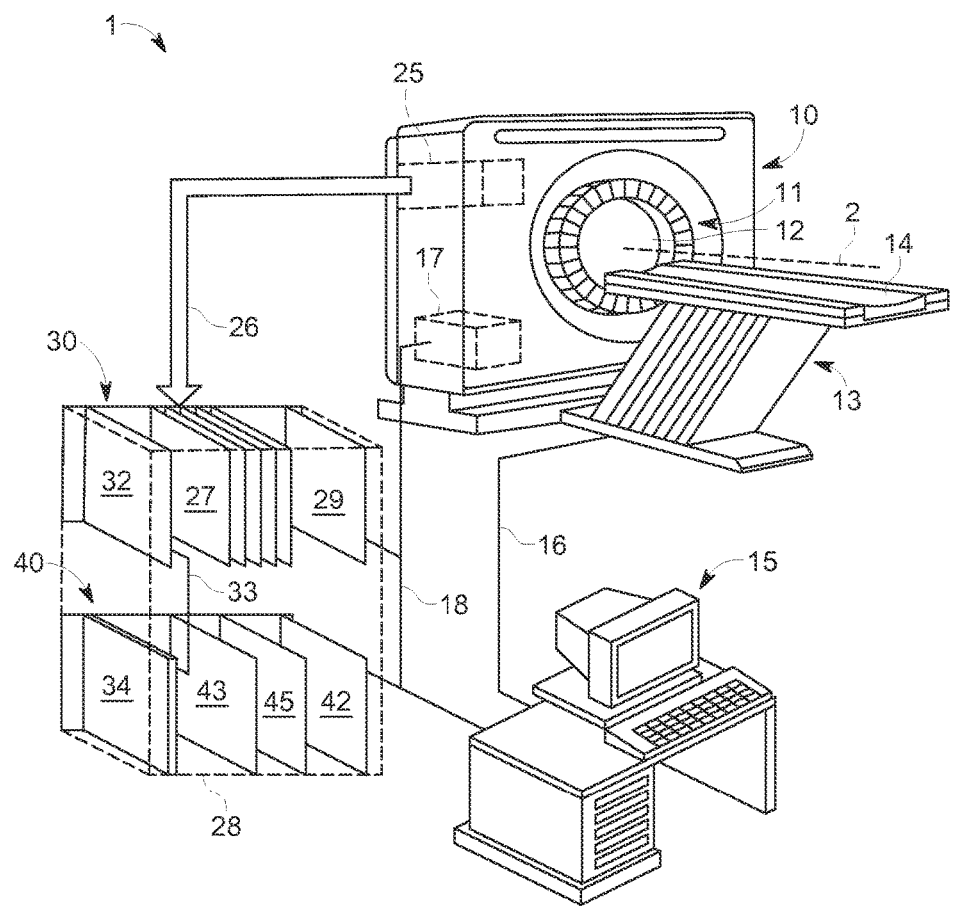
FIG. 7 illustrates an imaging system in accordance with various embodiments.
Figure 8:
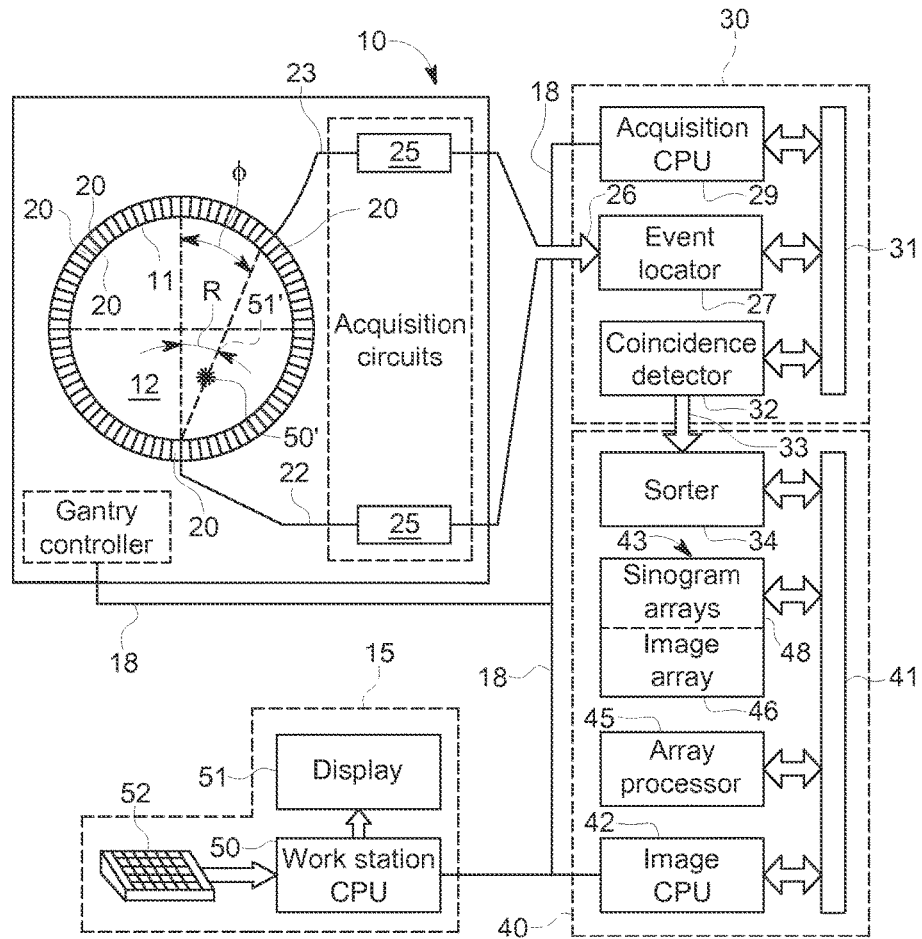
FIG. 8 is a schematic diagram of the imaging system of FIG. 7.
Figure 9:
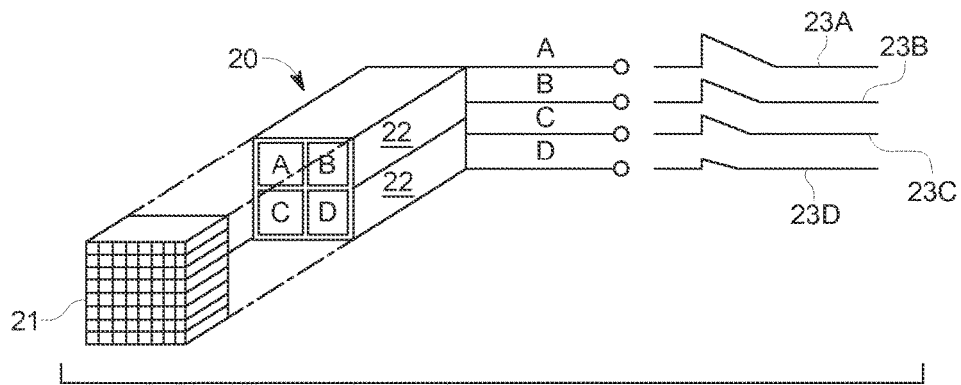
FIG. 9 illustrates an example of a detector module which forms part of the imaging system in accordance with various embodiments.

FIGS. 7-9 illustrate a PET imaging system with which various embodiments described herein may be employed. In other embodiments, crystal arrays as discussed herein may be utilized with other imaging systems (e.g., imaging systems configured for one or more additional or alternative modalities). FIG. 7 illustrates a PET scanning system 1 including a gantry 10 that supports a detector ring assembly 11 about a central opening or bore 12. The detector ring assembly 11 in the illustrated embodiments is generally circular and is made up of plural rings of detector 110 spaced along a central axis 2 to from a cylindrical detector ring assembly. In various embodiments, the detector ring assembly 11 may include 5 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 8, the operator work station 15 includes a central processing unit (CPU) 50, a display 51, and a keyboard 52. An operator may use the keyboard to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

The detector ring assembly 11 includes a number of detector modules. For example, the detector ring assembly 11 may include 36 detector modules, with each detector module including eight detector blocks. An example of one detector block 20 is shown in FIG. 7. The detector blocks 20 in a detector module may be arranged, for example, in a 2×4 configuration such that the circumference of the detector ring assembly 11 is 72 blocks around, and the width of the detector assembly 11 is 4 detector blocks wide. Each detector block 20 may include a number of individual detector crystals. In the illustrated embodiment, the array of detector crystals 21 is situated in front of four photosensors 22. The photosensors 22 are depicted schematically as photomultiplier tubes; however, it may be noted that SiPM's may be employed in various embodiments. Other configurations, sized and numbers of detector crystals, photosensors and detector modules may be employed in various embodiments.

During a PET scan, an annihilation photon may impact one of the detector crystals 21. The detector crystal 21, which may be formed, for example of lutetium yttrium silicate (LYSO) or bismuth germinate (BGO), for example, converts the annihilation photon into a number of photons which are received and detected by the photosensors. The photons generated by a detector crystal generally spread out to a certain extent and travel into adjacent detector crystals such that each of the four photosensors 22 receives a certain number photons as a result of an annihilation photon impacting a single detector crystal 21.

In response to a scintillation event, each photosensor 22 produces a signal 23A-23D on one of the lines A-D, as shown in FIG. 9, which rises sharply when a scintillation event occurs and then tails off exponentially. The relative magnitudes of the signals are determined by the position in the detector crystal array at which the scintillation event took place. The energy of the annihilation photon which caused the scintillation event determines the total magnitude of the four signals. The time that the signal begins to rise is determined by when the scintillation event occurs and the time required for photons to travel from the position of the scintillation event to the photosensors. The example depicted in FIG. 9 provides an example based on a vacuum photodetector; however, it may be noted that certain principles disclosed herein may also be applied to SiPM detectors generally.

As shown in FIG. 8, a set of acquisition circuits 25 is mounted within the gantry 10 to receive the four signals from the detector block 20. The acquisition circuits 25 determine timing, energy and the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPU 29 which controls communications on the local area network 18 and a bus 31. The event locator circuits 27 assemble the information regarding each valid event into a set of digital numbers that indicated when the event took place and the identity of the detector crystal 21 which detected the event. The event locator circuits 27, for example, may use a detector position map to map a pair of coordinates to the detector 21 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., 6 nanoseconds. As another example, the locations indicated by the two event data packets may be required to lie on a straight line which passes through the field of view (FOV) of in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital number that precisely identify the locations of the two detector crystals 21 that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (θ) and pass through the scanner's field of view is a complete projection, or "view", which makes a set of sinogram. The distance (R) between a particular projection ray and the center of the field of view locates that projection ray within the view. As shown in FIG. 6, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the detector crystals 21 lying on the projection ray. During an emission scan, the coincidence counts are organized in memory 43, for example as a set of two-dimensional array, one for each axial image, and each having as one of its dimensions the projection angle θ and the other dimension the distance R. This θ by R map of the measured events may be referred to as sinogram array 48. The sorter 34 may also organize the coincidence events into other data formats. In a projection plane format, for example, other variables may be used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation photons by the patient, detector gain non-uniformities, random coincidences, and integrator dead time. Each row of the corrected sinogram array is then Fourier transformed by the array processor 45 and multiplied by a one-dimensional filter array. The filtered data is then invers Fourier transformed, and each array element is back projected to form the image array 46. The image CPU 42 may either store the image array data or output the data to the operator work station 15.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A positron emission tomography (PET) photosensor output circuit configured to be operably coupled to a PET photosensor system, the photosensor output circuit comprising:
   a plurality of regional circuit portions, each regional circuit portion configured to be operably coupled to a corresponding photosensor system region and comprising:
   an input portion configured to receive a signal from the corresponding photosensor system region,
   a first branch extending from the input portion, the first branch comprising a delay unit and a switch, the delay unit interposed between the input portion and the switch, the delay unit having a length of delay, and
   a second branch extending from the input portion, the second branch comprising a sensor unit configured to detect a strength of a signal received via the input portion, wherein the length of delay of the delay unit of the first branch is configured to provide sufficient time for evaluation of the signal of the second branch, the sensor unit coupled to and controlling the switch, the sensor unit configured to place the switch in a closed position when the signal received via the input portion satisfies a threshold corresponding to a strength exceeding a dark current signal strength, and to place the switch in an open position when the signal received via the input portion does not satisfy the threshold, wherein the regional circuit portion provides a regional circuit output including the signal when the switch is in the closed position; and a summing portion operably coupled to the regional circuit portions, the summing portion configured to receive corresponding regional circuit outputs from the regional circuit portions, and to combine the regional circuit outputs to provide a summed output.

2. The photosensor output circuit of claim 1, wherein the summing portion comprises a summing amplifier, an analog-to-digital converter operably coupled to the summing amplifier and configured to provide an energy output, and a timing-to-digital converter operably coupled to the summing amplifier and configured to provide a timing output.

3. The photosensor output circuit of claim 1, wherein the summing portion is configured to provide a PET timing signal.

4. The photosensor output circuit of claim 1, wherein the summing portion is configured to provide a PET energy signal.

5. The photosensor output circuit of claim 1, wherein the summing portion is configured to receive a positional signal that bypasses at least one of the switches of the regional circuit portions.

6. The photosensor output circuit of claim 1, wherein the photosensor output circuit is configured as an integrated chip (IC) that is operably coupled to the photosensor system.

7. The photosensor output circuit of claim 1, wherein the regional circuit portions are disposed on a complementary metal oxide semiconductor (CMOS) that includes the photosensor system regions.

8. The photosensor output circuit of claim 1, wherein each photosensor system region comprises plural photosensor units, wherein each photosensor unit is configured to provide an output that is independent of outputs of other photosensor units of the corresponding photosensor system region.

9. A positron emission tomography (PET) photosensor system including:

plural photosensor regions separated from each other by light barriers, each photosensor region comprising plural photosensor units configured to be operably coupled to at least a portion of a crystal array, each photosensor region configured to receive light from the at least a portion of the crystal array and to provide a regional photosensor output signal responsive to the received light; and a photosensor output circuit operably coupled to the plural photosensor regions, the photosensor output circuit comprising:

a plurality of regional circuit portions, each regional circuit portion configured to be operably coupled to a corresponding photosensor system region and comprising:

an input portion configured to receive the regional photosensor output signal from the corresponding photosensor system region, a first branch extending from the input portion, the first branch comprising a delay unit and a switch, the delay unit interposed between the input portion and the switch, the delay unit having a length of delay, and a second branch extending from the input portion, the second branch comprising a sensor unit configured to detect a strength of a signal received via the input portion, wherein the length of delay of the delay unit of the first branch is configured to provide sufficient time for evaluation of the signal of the second branch, the sensor unit coupled to and controlling the switch, the sensor unit configured to place the switch in a closed position when the signal received via the input portion satisfies a threshold corresponding to a strength exceeding a dark current signal strength, and to place the switch in an open position when the signal received via the input portion does not satisfy the threshold, wherein the regional circuit portion provides a regional circuit output including the signal when the switch is in the closed position; and a summing portion operably coupled to the regional circuit portions, the summing portion configured to receive corresponding regional circuit outputs from the regional circuit portions, and to combine the regional circuit outputs to provide a summed output.

10. The PET photosensor system of claim 9, wherein each regional photosensor region includes plural photosensors.

11. The PET photosensor system of claim 9, wherein the regional photosensor regions correspond to portions of the crystal array separated from each other by light barriers.

12. The PET photosensor system of claim 9, wherein the summing portion comprises a summing amplifier, an analog-to-digital converter operably coupled to the summing amplifier and configured to provide an energy output, and a timing-to-digital converter operably coupled to the summing amplifier and configured to provide a timing output.

13. The PET photosensor system of claim 9, wherein the summing portion is configured to provide a PET timing signal.

14. The PET photosensor system of claim 9, wherein the summing portion is configured to provide a PET energy signal.

15. The PET photosensor system of claim 9, wherein the summing portion is configured to receive a positional signal that bypasses at least one of the switches of the regional circuit portions.

16. The PET photosensor system of claim 9, wherein the photosensor output circuit is configured as an integrated chip (IC) that is operably coupled to the photosensor system.

17. The PET photosensor system of claim 9, wherein the photosensor output circuit is disposed on a complementary metal oxide semiconductor (CMOS) that includes the photosensor system regions.

18. The photosensor system of claim 9, wherein each photosensor region comprises plural photosensor units, wherein each photosensor unit is configured to provide an output that is independent of outputs of other photosensor units of the corresponding photosensor region.

19. A method comprising:

operably coupling a positron emission tomography (PET) photosensor system including plural photosensor regions to a crystal array, the photosensor regions separated from each other by light barriers, each photosensor region comprising plural photosensor units operably coupled to at least a portion of the crystal array, each photosensor region configured to receive light from the at least a portion of the crystal array and to provide a regional photosensor output signal responsive to the received light; and operably coupling the photosensor regions to a photosensor output circuit, the photosensor output circuit comprising:

a plurality of regional circuit portions, each regional circuit portion configured to be operably coupled to a corresponding photosensor system region and comprising:

an input portion configured to receive the regional photosensor output signal from the corresponding photosensor system region, a first branch extending from the input portion, the first branch comprising a delay unit and a switch, the delay unit interposed between the input portion and the switch, the delay unit having a length of delay, and a second branch extending from the input portion, the second branch comprising a sensor unit configured to detect a strength of a signal received via the input portion, wherein the length of delay of the delay unit of the first branch is configured to provide sufficient time for evaluation of the signal of the second branch, the sensor unit configured to place the switch in a closed position when the signal received via the input portion satisfies a threshold corresponding to a strength exceeding a dark current signal strength, and to place the switch in an open position when the signal received via the input portion does not satisfy the threshold; and a summing portion operably coupled to the regional circuit portions, the summing portion configured to receive corresponding regional circuit outputs from the regional circuit portions, and to combine the regional circuit outputs to provide a summed output.

20. The method of claim 19, wherein the summing portion comprises a summing amplifier, an analog-to-digital converter operably coupled to the summing amplifier and configured to provide an energy output, and a timing-to-digital converter operably coupled to the summing amplifier and configured to provide a timing output.

21. The method of claim 19, wherein the photosensor output circuit is configured as an integrated chip (IC) that is operably coupled to the photosensor system.

22. The method of claim 19, wherein the regional circuit portions are disposed on a complementary metal oxide semiconductor (CMOS) that includes the photosensor system regions.

* * * * *